United States Patent
Zemach et al.

(10) Patent No.: US 11,483,244 B2
(45) Date of Patent: Oct. 25, 2022

(54) PACKET BUFFER SPILL-OVER IN NETWORK DEVICES

(71) Applicant: Marvell Israel (M.I.S.L) Ltd., Yokneam (IL)

(72) Inventors: Rami Zemach, Givat Shapira (IL); Itay Peled, Hagor (IL); Jacob Jul Schroder, Lyngby (DK); Zvi Shmilovici Leib, Tel Aviv (IL); Gideon Navon, Tel-Aviv (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 17/205,502

(22) Filed: Mar. 18, 2021

(65) Prior Publication Data

US 2021/0297354 A1 Sep. 23, 2021

Related U.S. Application Data

(60) Provisional application No. 62/991,431, filed on Mar. 18, 2020.

(51) Int. Cl.
*H04L 47/122* (2022.01)
*H04L 47/33* (2022.01)
(Continued)

(52) U.S. Cl.
CPC .......... *H04L 47/122* (2013.01); *H04L 47/33* (2013.01); *H04L 47/521* (2013.01); *H04L 47/722* (2013.01); *H04L 49/9078* (2013.01)

(58) Field of Classification Search
None
See application file for complete search history.

(56) References Cited

U.S. PATENT DOCUMENTS 6,249,793 B1 6/2001 Printezis et al.
6,473,815 B1 * 10/2002 Lu ................... H04L 49/9078
370/402

(Continued)

FOREIGN PATENT DOCUMENTS

GB 2461881 A 1/2010
WO WO-2019/102369 A1 5/2019

OTHER PUBLICATIONS

International Search Report and Written Opinion in International Patent Application No. PCT/IB2021/052297, dated Jun. 11, 2021 (13 pages).

*Primary Examiner* — Scott B Christensen

(57) ABSTRACT

Packets to be transmitted from a network device are buffered in queues in a first packet memory. In response to detecting congestion in a queue in the first packet memory, groups of multiple packets are transferred from the first packet memory to a second packet memory, the second packet memory configured to buffer a portion of traffic bandwidth supported by the network device. Prior to transmission of the packets among the one or more groups of multiple packets from the network device, packets among the one or more groups of multiple packets are transferred from the second packet memory back to the first packet memory. The packets transferred from the second packet memory back to the first packet memory are retrieved from the first packet memory and are forwarded to one or more network ports for transmission of the packets from the network device.

22 Claims, 4 Drawing Sheets

(51) Int. Cl.
*H04L 47/52* (2022.01)
*H04L 47/722* (2022.01)
*H04L 49/90* (2022.01)

(56) References Cited

U.S. PATENT DOCUMENTS

| | | |
|---|---|---|
| 7,089,326 B2 | 8/2006 | Boucher et al. |
| 8,578,380 B1 | 11/2013 | Adams et al. |
| 9,112,708 B1 | 8/2015 | Arad et al. |
| 9,306,876 B1 | 4/2016 | Ulman et al. |
| 9,887,929 B2 | 2/2018 | Shamis et al. |
| 10,200,313 B2 | 2/2019 | Zemach et al. |
| 2005/0240745 A1 | 10/2005 | Iyer et al. |
| 2005/0259672 A1 | 11/2005 | Eduri |
| 2007/0223482 A1 | 9/2007 | Wyatt |
| 2012/0215997 A1* | 8/2012 | Stanfill ............ G06F 12/02  711/158 |
| 2014/0169378 A1 | 6/2014 | Shumsky et al. |
| 2014/0307740 A1 | 10/2014 | Li et al. |
| 2015/0215226 A1 | 7/2015 | Peled et al. |
| 2017/0289048 A1* | 10/2017 | Chao ............... H04L 43/0864 |
| 2019/0015414 A1 | 1/2019 | Gruber et al. |

* cited by examiner

PACKET BUFFER SPILL-OVER IN NETWORK DEVICES

CROSS REFERENCE TO RELATED APPLICATIONS

This application claims the benefit of U.S. Provisional Patent App. No. 62/991,431, entitled "Modular Spill Over in a Network Switch," filed on Mar. 18, 2020, the disclosure of which is hereby expressly incorporated herein by reference in its entirety.

FIELD OF TECHNOLOGY

The present disclosure relates generally to communication networks, and more particularly to buffering packets in a network device.

BACKGROUND

Network devices such as network switches, routers, edge devices and the like often utilize packet memories to buffer packets while the packets are being processed by the network device and/or are awaiting transmission during times of congestion experienced by output ports of the network device. Typically, a network device utilizes either an internal packet memory (e.g., a packet memory implemented on a same chip as a packet processor of the network device) or external packet memory (e.g., a packet memory implemented as a separate device external to a packet processor chip of the network device). Internal packet memories are typically smaller than external packet memories, but internal packet memories typically have higher access bandwidths than external packet memories. External packet memories, on the other hand, are typically larger and provide more storage capacity than internal packet memories, but external packet memories typically have lower access bandwidths than internal packet memories. The lower access bandwidths of external packet memories do not have sufficient bandwidths to support buffering of full bandwidths supported by many current network devices.

SUMMARY

In an embodiment, a method for processing packets in a network device includes: receiving, at a packet processor of the network device, packets ingressing via a network port among a plurality of network ports of the network device; processing, with the packet processor, the packets at least to determine one or more network ports, among the plurality of network ports, via which the packets are to be transmitted from the network device; buffering, with the packet processor, the packets in a first packet memory; detecting congestion in a queue in the first packet memory; in response to detecting congestion in the first packet memory, dynamically transferring, in respective one or more transfers, respective one or more groups of multiple packets from the first packet memory to a second packet memory, the second packet memory configured to buffer a portion of traffic bandwidth supported by the network device; subsequent to transferring a group of multiple packets from the first packet memory to the second packet memory and prior to transmission of packets among the group of multiple packets from the network device, requesting, with the packet processor, transfer of the group of multiple packets from the second packet memory back to the first packet memory; retrieving, with the packet processor from the first packet memory, the packets transferred from the second packet memory back to the first packet memory; and forwarding, with the packet processor, the packets retrieved from the first packet memory to the one or more network ports determined for transmission of the packets from the network device.

In another embodiment, a network device comprises a plurality of network ports configured to couple to a plurality of network links and a packet processor coupled to the plurality of network ports. The packet processor configured to: process packets, received via a network port among the plurality of network ports of the network device, at least to determine one or more network ports, among the plurality of network ports, via which the packets are to be transmitted from the network device; buffer the packets in queues in a first packet memory; detect congestion in a queue in the first packet memory; in response to detecting congestion in the first packet memory, dynamically transfer, in respective one or more transfers, respective one or more groups of multiple packets from the first packet memory to a second packet memory, the second packet memory configured to buffer a portion of traffic bandwidth supported by the network device; subsequent to transferring a group of multiple packets from the first packet memory to the second packet memory and prior to transmission of packets among the group of multiple packets from the network device, request transfer of the group of multiple packets from the second packet memory back to the first packet memory; retrieve, from the first packet memory, the packets transferred from the second packet memory back to the first packet memory; and forward the packets retrieved from the first packet memory to the one or more network ports determined for transmission of the packets from the network device.

DETAILED DESCRIPTION

Figure 1:
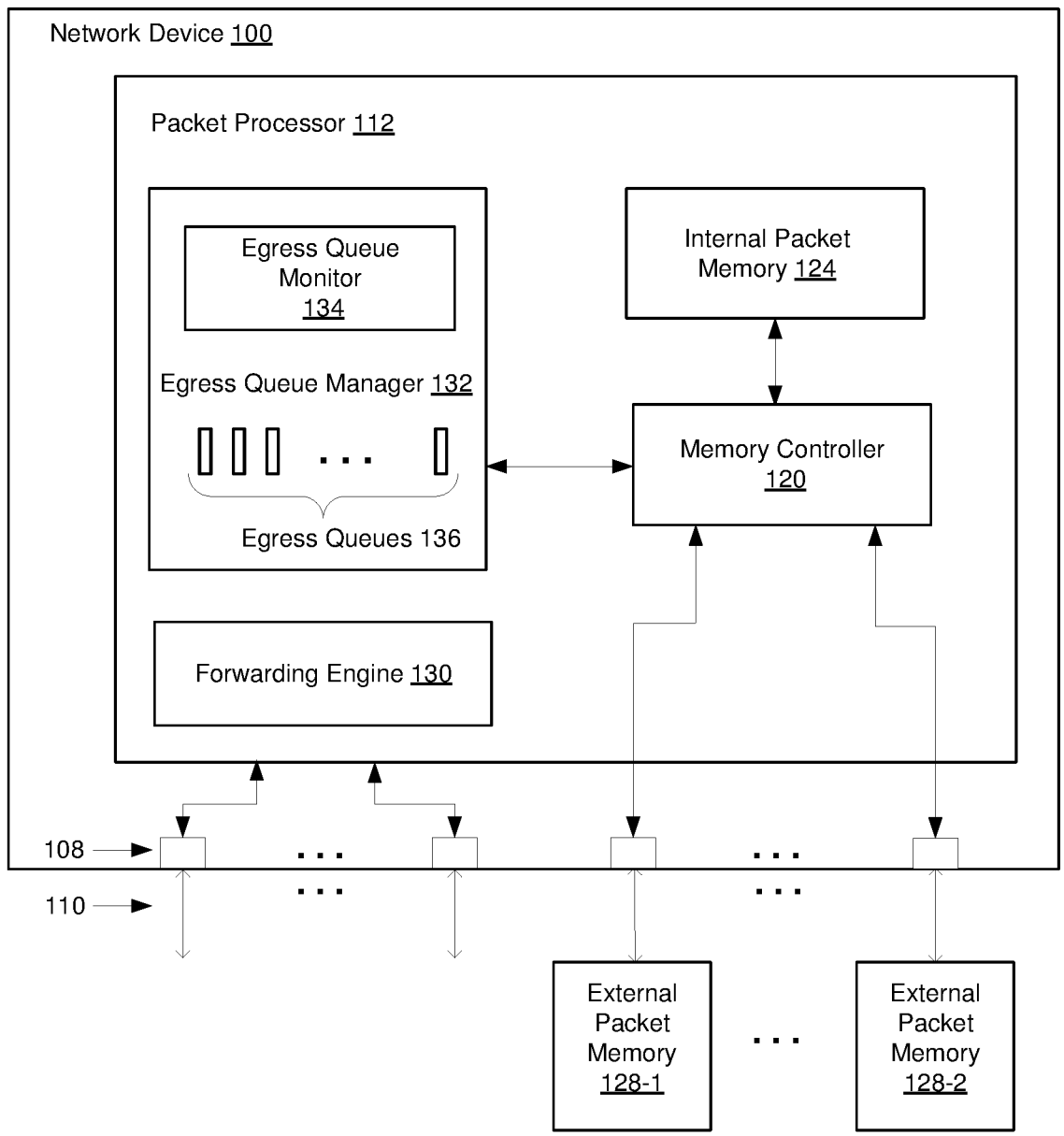
FIG. 1 is a block diagram of an example network device configured to implement spill-over of packets from a first packet memory to one or more second packet memories, according to an embodiment.

In embodiments described below, a network device is configured to utilize a first packet memory and at least one second packet memory for buffering packets received at the network device until the packets can be transmitted by the network device, for example during times of congestion experienced by output network ports of the network device. The first packet memory has an access bandwidth that is relatively higher as compared to an access bandwidth of the at least one second packet memory. For example, the first packet memory has a sufficiently high access bandwidth to support buffering of full bandwidth supported by the network device, whereas the at least one second packet memory does not have sufficiently high bandwidth to support buffering of full bandwidth supported the network device, in an embodiment. On the other hand, the first packet memory, which has the sufficiently high access bandwidth, is relatively smaller in size and lower in storage capacity as compared to the at least one second packet memory, in an embodiment.

In an embodiment, the network device is configured to initially store packets in the first packet memory, and to transfer packets to the at least one second packet memory, as needed, according to congestion state at the network device. For example, the network device is configured to detect congestion in an egress queue corresponding to a particular network port of the network device, for example based on detecting that a length of the egress queue in the first packet memory exceeds a threshold, and in response to detecting congestion in the egress queue, transfer one or more packets in the particular egress queue from the first packet memory to the second packet memory, allowing the egress queue to "spill-over" from the first packet memory to the second packet memory, in an embodiment. In an embodiment, buffers in the second packet memory are larger than buffers in the first packet memory, and the network device is configured to transfer one or more groups of multiple packets from the first packet memory in respective one or more transfers to the second packet memory, to more efficiently utilize the larger buffers in the second packet memory. In an embodiment, the packets from the particular egress queue that are transferred from the first packet memory to the second packet memory are maintained in a corresponding queue in the second packet memory, to preserve the order in which the packets were stored in the first packet memory. Subsequently, in an embodiment, prior to transmission of the one or more packets from the network device, the one or more packets are transferred from the second packet memory back to the first packet memory, and, in an embodiment, are re-linked with the egress queue in the first packet memory so that the packets can subsequently be scheduled for transmission from the egress queue in the first packet memory. The network device then schedules transmission of the one or more packets from the first packet memory, in an embodiment. Because only a fraction of packets processed by the network device is transferred from the first packet memory to the second packet memory, the second, lower bandwidth, packet memory needs to support only a fraction of the bandwidth supported by the network device, in an embodiment. Moreover, transferring packets from the first packet memory to the second packet memory on a per-egress queue basis, maintaining the order of the packets from particular egress queues in corresponding queues in the second packet memory, and re-linking the packets with the corresponding egress queues when the packets are transferred from the second packet memory back to the first packet memory, ensures that the packets are transmitted from the network device without changing the order in which the packets were received by the network device, in an embodiment.

In some embodiments, the network device is configured to support a modular buffering architecture in which the number of second, low-bandwidth, packet memories utilized by the network device depends on buffering capacity required or desired for the network device, as determined, for example, by a location of the network device within a network. For example, a network device at an edge of a network requires lower buffering capacity than a network device positioned in a distribution layer of a network, and a network device positioned in the distribution layer of the network requires lower buffering capacity than a switch at the core of the network, in an embodiment. Thus, for example, the network device at the core of the network is configured to utilize two second packet memories, and to allow traffic buffered in the first packet memory to spill over, as needed, across the two second packet memories. On the other hand, a network device at the distribution layer of the network is configured to utilize only a single second packet memory, and a network device at the edge of the network is configured to buffer all traffic, as needed, in only the first packet memory without using any second packet memory, in various embodiments. The modular buffering architecture of the present disclosure thus allows for a same core chip of the network device to be deployed in network devices positioned at various locations within a network, with a number of second packet memories utilized by the network device depending on the particular location of the network device within the network, in at least some embodiments.

FIG. 1 is a block diagram of an example network device 100 configured to implement spill-over of packets from a first packet memory to one or more second packet memories, according to an embodiment. The network device 100 includes a plurality of network ports 108 configured to couple to respective network links 110 for coupling the network device 100 to other devices in a network. The network device 100 also includes a packet processor 112 coupled to the network ports 108. The packet processor 112 is configured to process packets received via the network ports 108, and to determine one or more other network ports 108 via which packets are to be forwarded to one or more other devices on the network. In some embodiments, a data unit corresponding to a packet, such as a packet descriptor corresponding to the packet, is generated, and the packet descriptor rather than the packet itself is provided to the packet processor 112 for processing of the packet. The packet descriptor includes header information and other information associated with the packet, in an embodiment. The packet processor 112 is configured to update information in the packet descriptor, as needed, during processing of the packet descriptor, in an embodiment. For ease of explanation, the term "packet" hereinafter is used to refer to a packet itself or to a packet descriptor associated with the packet.

The packet processor 112 includes a memory controller 120, in an embodiment. The memory controller 120 is coupled to a first packet memory 124. Additionally, the memory controller 120 is coupled to one or more second packet memory 128, in an embodiment. In an embodiment, the first packet memory 124 is implemented on a same chip as the packet processor 112. On the other hand, the one or more second packet memories 128 are not implemented on the same chip as the packet processor 112, in an embodiment. For example, the one or more second packet memories 128 are implemented as one or more separate devices external to the network device 100, or are included in one or more separate devices external to the network device 100, in an embodiment. In an embodiment, the one or more second packet memories 128 are implemented as, or included in, one or more memory devices coupled the network device 100 via respective one or more network ports 108. In other words, one or more network ports 108 of the network device 100 are used to provide coupling of the network device 100 to the one or more second packet memories 128 instead of coupling the network device 100 to other devices on the network, in this embodiment. In another embodiment, at least one of the one or more second packet memories 128 is implemented as, or included in, a memory device coupled the network device 100 via an interface other than a network port 108. For example, the at least one second packet memories 128 is implemented as, or included in, a memory device coupled the network device 100 via a peripheral component interconnect (PCI) interface, a PCI express (PCIe) interface, a double data rate (DDR) memory interface, a graphics double data rate (GDDR) memory interface, a flash memory interface, or any other suitable type of memory interface.

In another embodiment, at least one of the one or more second packet memories 128 is implemented on a different chip from the packet processor 112, but the at least one of the one or more second packet memories 128 is nonetheless internal to the network device 100 (e.g., packaged together with other components of the network device 100). For example, in an embodiment, the external packet memory 128 is provided in place of a network port chiplet corresponding to a network port 108, or is provided instead of a physical layer (PHY) chiplet corresponding to a port 108, packaged together with the packet processor 112 of the network device 100, in an embodiment.

By way of example, the first packet memory 124 is sometimes referred to herein as "internal packet memory 124" and the one or more second packet memories 128 are sometimes referred to herein as "external packet memories 128" or collectively as "external packet memory 128." However, the first packet memory 124 and the or more second packet memories 128 are both internal packet memories or are both external packet memories, in some embodiments.

In an embodiment, the internal packet memory 124 is implemented using static random access memory (SRAM) technology, and each of the one or more external packet memories 128 is implemented using dynamic random access memory (DRAM) technology. In other embodiments, the internal packet memory 124 and/or the one or more of the external packet memories 128 are implemented using other suitable technologies. In an embodiment, the one or more external packet memories 128 are implemented as double data rate (DDR) type memories. In other embodiments, the one or more external packet memories include any suitable combination of one or more of a graphics double data rate (GDDR) memory, a flash memory, and any other suitable type of memory.

In various embodiments, the internal packet memory 124 has different access bandwidth, cost, size, storage capacity and other characteristics as compared to the external packet memory 128. For example, the internal packet memory 124 has a higher access bandwidth and is capable of operating at full wire speed supported by the network device 100, in an embodiment. Conversely, in some embodiments, the external packet memory 128 has a lower access bandwidth and is not capable of operating at full wire speed supported by the network device 100. However, the internal packet memory 124 is more costly than the external packet memory 128, in at least some embodiments. Moreover, the internal packet memory 124 occupies on-chip space that is suitable for adding additional processing circuitry, for example, in an embodiment. Thus, due for example to cost and size constraints, the internal packet memory 124 is generally smaller in size and lower in storage capacity than the external packet memory 128, in some embodiments. As merely an example, the internal packet memory 124 has a storage capacity on the order of megabytes (MB) or less, while each of the external packet memories 128 has a storage capacity on the order of gigabytes (GB) or more, in an embodiment.

In an embodiment, the packet processor 112 is configured to initially enqueue processed packets in the internal packet memory 124 and to transfer packet to the external packet memory 128, as needed, allowing the packets to spill over into the second packet memory 128. For example, as will be explained in more detail below, the packet processor 112 is configured to transfer packets in one or more congested egress queues in the internal packet memory 124 to the external packet memory 128. In an embodiment, buffers in the external packet memory 128 are larger than buffers in the internal packet memory 124, and the packet processor 112 is configured to transfer one or more groups of multiple packets from the internal packet memory 124, in respective one or more transfers, to the external packet memory 128, to more efficiently utilize the larger buffers in the external packet memory 128. Subsequently prior to transmission of the packets that have spilled over from the first packet memory 124 to the second packet memory 128, the packet processor 112 requests the packets to be transferred back to the internal packet memory 124, in an embodiment. The packet processor 112 then links packets transferred back to the internal packet memory 124 with the corresponding egress queues in the internal packet memory 124. When scheduled for transmission, the packets are then retrieved from the internal packet memory 124 and forwarded to appropriate network ports for transmission of the network device 100, in an embodiment.

In an embodiment, packets, or groups of packets, transferred from an egress queue in the internal packet memory 124 are stored in a corresponding queue in the external packet memory 128, to maintain the order of the packets in which the packets were stored in the internal packet memory 124. In an embodiment, the packet processor is configured to continue transferring packets, or groups of packets, as needed from a congested egress queue in the internal packet memory 124 to the external packet memory 128 while continuing to monitor congestion of the egress queue in the internal packet memory 124. Thus, during a life of the egress queue in the network device 100, multiple transfers of packets, or groups of packets, occur between the internal packet memory 124 and the external packet memory 128 as packets from a head of a corresponding queue in the external packet memory 128 are transferred back to the internal packet memory 124, and additional packets from the egress queue in the internal packet memory 124 are transferred to the external memory 128 and are added to the tail of the corresponding queue in the external packet memory 128.

In an embodiment, the packet processor 112 is configured to transfer only a portion of packets stored in the internal packet memory 124 to the external packet memory 128, while other packets remain in the internal packet memory 124 for the entire time until the packet processor 112 retrieves the packets from the internal packet 124 for transmission of the packets via network ports 108 determined for transmission of the packets. For example, the packet processor 112 is configured to only transfer packets from congested egress queues in the internal packet memory 124, while packets in non-congested egress queues remain in the internal packet memory 124 until the packets are retrieved from the packet memory 124 for transmission of the packets via network ports 108 determined for transmission of the packets, in an embodiment. Thus, only packets from congested egress queues spill over to the external packet memory 128, while non-congested egress queues remain entirely in the internal packet memory 124, in an embodiment. Because only a fraction of packets processed by the network device 100 is transferred from the internal packet memory 124 to the external packet memory 128, the external packet memory 128 needs to support only a fraction of the bandwidth supported by the network device 100, in at least some embodiments. Moreover, transferring packets to from the internal packet memory 124 to the external packet memory 128 on a per-egress queue basis, and re-linking the packets with the corresponding egress queues when the packets are transferred from the external packet memory 128 back to the internal packet memory 124 ensures that the packets are transmitted from the network device 100 without changing the order in which the packets were received by the network device 100, in at least some embodiments.

In some embodiments, the number of external packet memories 128 that the network device 100 is configured to utilize depends on the buffering capacity required or desired for the network device 100, where the buffering capacity depends on a location of the network device 100 within a network, for example. For example, if the network device 100 is deployed at a core of the network, the network device 100 is configured to utilize two external packet memories 128, in an embodiment. In this case, two external packet memories are coupled to the network device 100 via two respective network ports 108, or are provided as chiplets external to the packet processor 112 of the network device 100, in various embodiments. On the other hand, if the network device 100 is deployed at a distribution layer of the network, the network device 100 is configured to utilize only a single external packet memory 128, in an embodiment. For example, in this case, only a single network port 108 of the network device 100 is used for coupling of the network device 100 to the external packet memory 128, or only a single chiplet within the network device 100 implements the external packet memory 128, in an embodiment. As yet another example, if the network device 100 is deployed as an edge device at an edge of the network, the network device 100 is configured to buffer all packets, as needed, in only the internal packet memory 124. In this case, no external packet memories 1288 need be coupled to, or otherwise provided for, the network device 100. Thus, a same core chip of network device 100 (e.g., a same core packet processor chip 112) is utilized to support various buffering needs of the network device 100, depending, for example, on the location of the network device 100 within the network, in various embodiments.

In operation, a packet received by the network device via a network port 108 is provided to the packet processor 112 for processing of the packet. The packet processor 112 includes a forwarding engine 130 configured to determine, based on information from the header of the packet, one or more network ports 108 via which the packet is to be transmitted from the network device 100, in an embodiment. In an embodiment, the forwarding engine 130 includes or is coupled to a forwarding database (not shown) that stores forwarding information (e.g., port information) associated with addresses (e.g., media access control (MAC) addresses, Internet Protocol (IP) addresses, etc.) and/or other suitable information, in an embodiment. In an embodiment, the forwarding engine 130 is configured to utilize header information to look up information in the forwarding database that indicates one or more network ports 108 to which the packet is to be forwarded. As merely an illustrative example, the forwarding engine 130 is configured to use a destination address in a header of a packet to perform a lookup in a forwarding database (not shown), which stores correspondences between destination addresses and network ports 108, to determine a particular network port 108 via which the packet is to be transmitted. As another illustrative example, the forwarding engine 130 is configured to use a VLAN ID in a header of a packet to perform a lookup in a forwarding database (not shown), which stores correspondences between VLAN IDs and network ports 108, to determine a particular set of network ports 108 for the packet. The forwarding engine 130 is configured to store an ID of a network port (or set of multiple network ports) in a packet descriptor corresponding to the packet, according to an embodiment. The packet processor 112 is configured to also perform classification of the packet, for example to determine a priority with which the packet is associated, a packet flow to which the packet belongs, etc., in an embodiment.

The packet processor 112 also includes an egress queue manager 132, in an embodiment. The egress queue manager 132 is configured to enqueue packets processed by the packet processor 112 in one of a plurality of egress queues 136. The egress queues 136 correspond to respective network ports 108, in an embodiment. The egress queues 136 correspond to respective network ports 108 and respective traffic flow priorities, in another embodiment. For example, a first subset of egress queues 136 corresponds to a first network port 108 and is used to buffer packets to be transmitted via the first network port 108, where respective egress queues 136 in the first subset of egress queues 136 are used to buffer packets that correspond to traffic flows associated with respective priorities, in an embodiment. Similarly, a second subset of egress queues 136 corresponds to a second network port 108 and is used to buffer packets to be transmitted via the second network port 108, where respective egress queues 136 in the second subset of egress queues 136 are used to buffer packets that correspond to traffic flows associated with respective priorities, and so on, in an embodiment. In general, a packet processed by the packet processor 112 is enqueued in appropriate one or more egress queues 136 for subsequent transmission of the packet via the one or more network ports 108 determined for the packet, in an embodiment.

In an embodiment, the egress queue manager 132 includes an egress queue monitor 134. The egress queue monitor 134 is configured to monitor metrics associated with egress queues 136, and, based on monitoring the metrics associated with the egress queues 136, detect when congestion occurs in the egress queues 136. For example, the egress queue monitor 136 is configured to monitor fill levels or lengths of the egress queues 136, and to detect congestion in a particular egress queue 136 when the fill level or the length of the particular egress queue 136 crosses (e.g., is above) a threshold. In an embodiment, packets that are queued in egress queues 136 that are not congested, and do not become congested while the packets are awaiting transmission from the network device 100, remain in the internal packet memory 124 until the packets are scheduled for transmission from the network device 100.

On the other hand, when the egress queue monitor 134 detects congestion in a particular egress queue 136, the egress queue manager 132 instructs the memory controller 120 to transfer one or more packets queued in the particular egress queue 136 in the internal packet memory 124 to the external memory 128, in an embodiment. In response, the memory controller 120 retrieves one or more packets queued in the particular egress queued and transfers the one or more packets to the external packet memory 128. In an embodiment in which the external packet memory 128 is coupled to the network device 100 via a network port 108, the memory controller 120 forwards the one or more packets retrieved from the internal packet memory 124 to the network port 108 for transmission of the packets to the external packet memory 128. As another example, in an embodiment in which the external packet memory 128 is provided in place of a port chiplet or a PHY chiplet corresponding to a network port 108, the memory controller 120 forwards the one or more packets directly to the external packet memory 128.

In an embodiment in which the network device 100 is configured to utilize multiple external packet memories 128, the memory controller 120 is configured to select a particular external packet memory 128, from among the multiple external packet memories 128, to which to transfer packets. In an embodiment, the memory controller 120 is configured to select a same memory 128 for transferring packets from a particular egress queue 136, so that the packets are queued in the particular external packet memory 128 in-order within the particular egress queue 136. On the other hand, the memory controller 120 is configured to distribute spillover of packets from different egress queues 136 among different external packet memories 128, to distribute spill-over traffic bandwidth among the multiple external packet memories 128, in an embodiment. In an embodiment, the memory controller 120 is pre-configured to select particular external packet memories 128 for transferring packet from particular egress queues 136. In another embodiment, the memory controller 120 is configured to dynamically select particular external packet memories 12 for transferring packets from particular egress queues 136.

In an embodiment, when the memory controller 120 transfers a packet to the external packet memory 128, the memory controller 120 also provides an indication of the particular egress queue 136 to which the packet corresponds to the external packet memory 128. For example, the memory controller 120 adds an indication of the particular egress queue 136 to a header of a packet, for example in a tag added to the header of the packet, prior to forwarding the packet for transfer to the external packet memory 128, in an embodiment. In an embodiment in which the memory controller 120 transfers a group of multiple packets to the external packet memory 128, the memory controller device 120 generates a tag to include an indication of the particular egress queue 126 to which the group of packets corresponds and attaches the tag as a header to the group of multiple packets. In another embodiment, the memory controller 120 provides the indication of the egress queue 136 in a separate in-band or out of-band control signal provided from the network device 100 to the external packet memory 128 separately from the transfer of the packet or the group of multiple packets to the external packet memory 128. The external packet memory 128 is configured to maintain egress queues corresponding to the egress queues 136 from which packets are transferred to the external packet memory 128, in an embodiment. The external packet memory 128 is configured to enqueue packets, or groups of multiple packets, received from the network device 100 in egress queues corresponding the egress queues 136 from which the packets were transferred to the external packet memory 128, in an embodiment.

In an embodiment, in response to an instruction from the egress queue manager 132 to transfer one or more packets from a particular egress queue 136 to the external packet memory 136, the memory controller 120 transfers one or more packets from a middle portion of the particular egress queue 136 to the external memory 128, while a head portion and a tail portion of the egress queue 136 remain in the internal packet memory 124. While packets from the middle portion of the particular egress queue 136 are stored in the external memory 128, the memory controller 120 continues to retrieve packets from the head portion of the particular egress queue 136 in the internal packet memory 124 and forward the packet to the network port 108 for transmission of the packets from the network device 100. Also, the memory controller 120 continues to enqueue new packets directed to the particular network port 108 at the tail of the egress queue 136 in the internal packet memory 124, in an embodiment.

The egress queue monitor 134 of the egress queue manager 132 is configured to, while a middle portion of an egress queue 136 is stored in the external memory 128, monitor a head portion of the egress queue 136 in the internal packet memory 124, in an embodiment. In response to the egress queue monitor 134 detecting that a fill level or a length of the head portion of the egress queue 136 in the internal packet memory 124 is below a threshold, the egress queue manager 132 triggers the memory controller 120 to initiate transfer of packets in the meddle portion of the egress queue 136 from the external packet memory 128 back to the internal packet memory 124, in an embodiment. The memory controller 120 is configured to initiate transfer of the packets in the middle portion of the queue 136 from the external packet memory 128 back to the internal packet memory 124 by generating a control message that includes an indication of the particular egress queue 136 from which to transfer packets back to the internal packet memory 124, and to provide the control message to the external packet memory 128, in an embodiment. For example, the memory controller 120 is configured to forward the control message to the network port 108 coupled to the external packet memory 128 for transmission of the control message to the external packet memory 12 "in-band" with packets transmitted to the external packet memory 128, in an embodiment. In another embodiment, the control message is transmitted to the external packet memory device 128 "out-of-band" via control lines between the network device 100 and the external packet memory 128.

In response to receiving a control message that indicates a particular egress queue 136, the external packet memory 128 (or a device that houses the external packet memory 128) initiates retrieval of packets queued in the corresponding egress queue in the external packet memory 128 and transmits the packets back to the network device 100. The packets are received by the network device 100, for example via the network port 108 coupled to the external packet memory 128 or via another interface to the external packet memory 128) and are provided to the memory controller 120, in an embodiment. The memory controller 120 is configured to enqueue the packets back into the particular egress queue 136 in the internal packet memory 124. To this end, in an embodiment, the memory controller 120 obtains indications of memory locations (e.g., buffers) in which to place the packets in the internal packet memory 124 from the egress queue manager 132 so that the packets are linked back to the head of the egress queue 136 in the internal packet memory 124 by the egress queue manager 132. When a last packet from the middle of the egress queue 136 is transferred from the external packet memory 128 to the internal packet memory 124, the last packet is also re-linked with the tail portion of the queue in the internal packet memory 124, in an embodiment. An example process implemented by the packet processor 112 for transferring of packets from the internal packet memory 124 to the external packet memory 128, and transferring the packets from the external packet memory 128 back to the internal packet memory 124, according to an embodiment, is described in more detail below with reference to FIGS. 2A-2D. In other embodiments, the packet processor 112 implements other suitable processes for transferring of packets to and from the external packet memory 128. Subsequently, when transmission of the packets is scheduled from the egress queue 136, the memory controller 120 retrieves the packets from the particular egress queue 136 in the internal packet memory 124 and forwards the packets to the particular network port 108 for transmission of the packets from the network device 100, in an embodiment.

FIGS. 2A-2D are diagrams illustrating a process 200 for transferring packets from an egress queue in a first packet memory to a second packet memory, and transferring of the packets from the second packet memory back to the first packet memory, according to an embodiment. The process 200 is implemented by the network device 100 of FIG. 1 to transfer packets from the internal packet memory 124 to the external packet memory 128, and to transfer packets from the external packet memory 128 back to the internal packet memory 124, in an embodiment. For ease of explanation, the process 200 is described with reference to the network device 100 of FIG. 1. In some embodiments, the process 200 is used with network devices different from the network device 100 of FIG. 1. Further, although the process 200 is illustrated and described with reference to only a egress queue, the network device 100 performs the process 200 with respect to multiple egress queues maintained by the network device 100 at any given time, in embodiments.

Figure 2A:
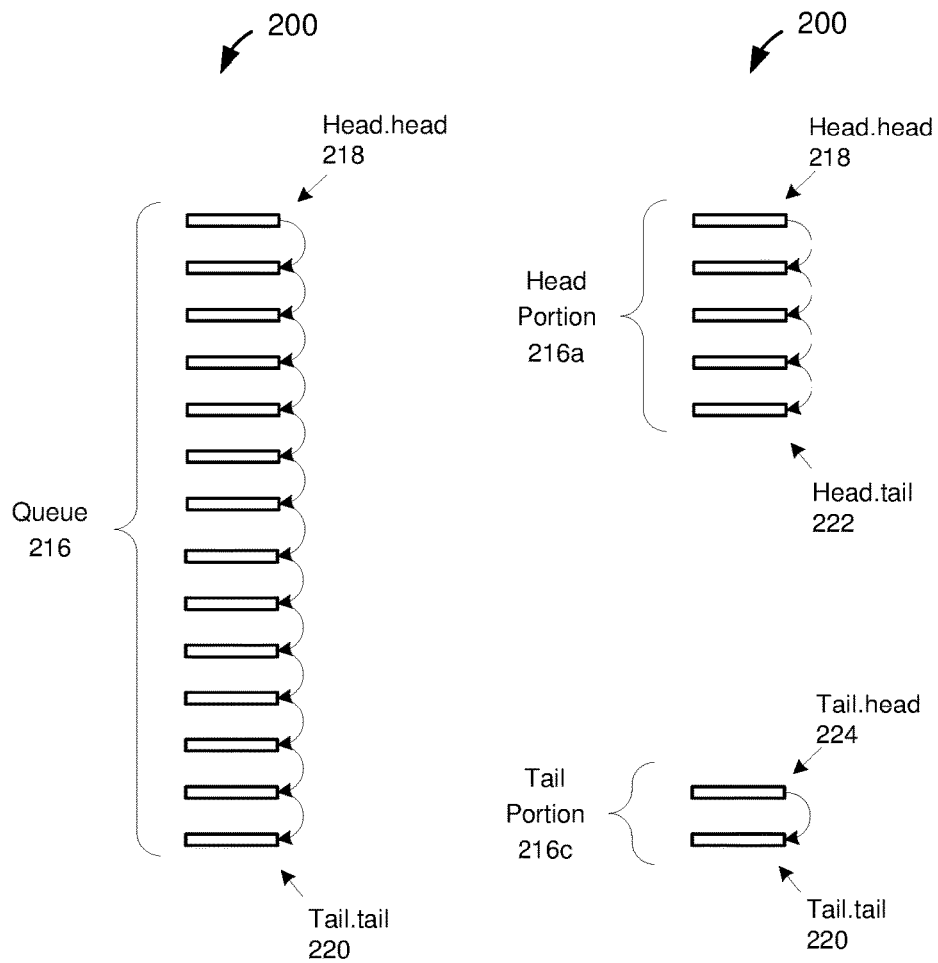
FIGS. 2A-2D are diagrams illustrating a process for transferring of a portion of an egress queue from a first packet memory to a second packet memory, and transferring of the portion of the egress queue from the second packet memory back to the first packet memory, according to an embodiment.

In an embodiment, an queue 216 (such as an egress queue, e.g., corresponding to an egress queue 136 in FIG. 1) is maintained by the egress queue manager 132 as a linked list of packets in the internal packet memory 124, in an embodiment. To maintain the egress queue 216 as a linked list in the internal packet memory 124, the egress queue manager 132 is configured to maintain a plurality of indictors (e.g., pointers) stored in a local memory or registers included in or coupled to the egress queue manager 132, to store indications of memory locations of elements (e.g., buffers) in the egress queue 216 in the internal packet memory 124. Referring first to FIG. 2A, the egress queue manager 132 is configured to maintain a "Head.head" indicator (e.g., pointer) 218 to indicate a memory location (e.g., a buffer) at which a packet currently at the head of the egress queue 216 is stored in the internal packet memory 124. The egress queue manager 132 is also configured to maintain a "Tail.tail" indicator (e.g., pointer) 220 to indicate a memory location at which a next packet to be enqueued in the egress queue 216 is to be placed in the internal packet memory 124.

In an embodiment, each element (e.g., buffer) in the internal packet memory 124 that stores a packet in the egress queue 216 also stores an indication (e.g., a pointer) to the element (e.g., buffer) in that stores the next packet in the queue 216. When the egress queue 216 is scheduled for transmission from the network device 100, the egress queue manager 132 provides the current value of the Head.head indicator 218 to the memory controller 120. In response, the memory controller 120 retrieves the packet from the head of the egress queue 216 from the memory location in the internal packet memory 124 indicated by the Head.head indicator 216, and forwards the packet to a corresponding network port 108 for transmission of the packet. Along with retrieving the packet from the internal packet memory 124, the memory controller 120 retrieves the indicator of the memory location (e.g., buffer) that stores the next packet in the egress queue 216, which is now at the head of the egress queue 216. The memory controller 120 provides the indicator of the memory location (e.g., buffer) that stores the next packet in the egress queue 216 to the egress queue manager 132, and the egress queue manager 132 updates the value of the Head.head indicator 220 to indicate the memory location of the packet that is currently at the head of the egress queue 216. On the other hand, when a new packet is to be enqueued in the egress queue 216, the egress queue manager 132 provides the current value of the Tail.tail indicator 220 to the memory controller 120, and the memory controller 120 places the packet in the internal packet memory 124 at the memory location indicated Tail.tail indicator 220, where the current value of the Tail.tail indicator 220 was stored in the element that stores a previous packet in the egress queue 216 in the internal packet memory 124, in an embodiment. The egress queue 216 in FIG. 2A is relatively short, and the egress queue 216 is maintained as a single linked list formed entirely in the internal packet memory 124, in an embodiment.

Figure 2B:
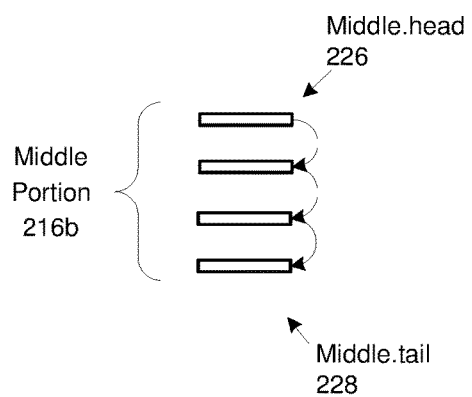

Referring now to FIG. 2B, as the egress queue 216 grows in the internal packet memory 124 and when congestion is detected in the egress queue 216, the memory controller 120 transfers one or more packets, or a group of multiple packets, from a middle portion 216b of the egress queue 216 to the external packet memory 128, while a head portion 216a and a tail portion 216c of the egress queue 216 remain in the first packet memory 124, in an embodiment. In an embodiment, the egress queue monitor 134 is configured to detect congestion in the egress queue 216 when a length (e.g., a fill level) of the queue 216 crosses a threshold, for example. In an embodiment, when the egress queue monitor 134 detects congestion in the egress queue 216 in the internal packet memory 124, the egress queue manager 132 saves the current value of the Tail.tail indicator 220 as a Head.tail indicator 224. The egress queue manager 132 is configured to continue enqueuing subsequent packets at the tail of the egress queue 216 in the internal packet memory 124, in an embodiment. Also, the memory controller 120 is configured to continue retrieving packets from the head of the egress queue 216, and forwarding the packets to the corresponding network port 108 for transmission, in an embodiment. In an embodiment, when a group of multiple packets (e.g., a group of four packets or another suitable number of packets), that can be stored in a single buffer in the external packet memory 128 is enqueued in the internal packet memory 124, the memory controller 120 transfers the group of packets from the internal packet memory 124, in a single transfer, to the external packet memory 128.

With continued reference to FIG. 2B, the memory controller 120 begins transferring packets from the egress queue 216 beginning with the packet at the memory location indicated by the Head.tail pointer 224, in an embodiment. When the memory controller 120 retrieves the packet from the memory location indicated by the Head.tail pointer 224, the memory controller 120 obtains the pointer to the next packet in the egress queue 216, and transfers the next packet in the egress queue 216 to the external packet memory 128, and so on, in an embodiment. New packets directed to the egress queue 216 continue to be added to the tail of the egress queue 216 in the internal packet memory 124, in an embodiment. Also, packets continue to be retrieved from the head of the egress queue 216 in the internal packet memory 124 for transmission of the packets from the network device 100, in an embodiment.

The packets, or groups of packets, from the middle of the egress queue 216 transferred to external packet memory 128 are queued as a linked list in the external packet memory 128 in the order in which the packets, or groups of packets, are received at the external packet memory 128, in an embodiment. For example, a queue manager associated with the external packet memory 128 is configured to maintain a "Middle.head" indicator (e.g., pointer) 226 to indicate a memory location (e.g., a buffer) at which a packet currently at the head of the middle portion 216b of the egress queue 216 is stored in the external packet memory 128. The egress queue manager associated with the external packet memory 128 is also configured to maintain a "Middle.tail" indicator (e.g., pointer) 228 to indicate a memory location at which a next packet to be enqueued in the egress queue 216 is to be placed in the internal packet memory 124. Further, each element (e.g., buffer) in the external packet memory 128 that stores a packet from the middle portion 216b of the egress queue 216 also stores an indication (e.g., a pointer) to the element (e.g., buffer) in that stores the next packet from the middle portion 216b of the egress queue 216, in an embodiment. In an embodiment, the queue manager associated with the external packet memory 128 is included internally to the packet processor 112. For example, the external packet memory 128 is a simple word-based read/write memory that does not include queuing functionality, in an embodiment. In another embodiment, the queue manager associated with the external packet memory 128 is external to the packet processor 110. For example, the queue manager associated with the external packet memory 128 is included in an external device that houses the external packet memory 128, in an embodiment.

Figures 2C, 2D:
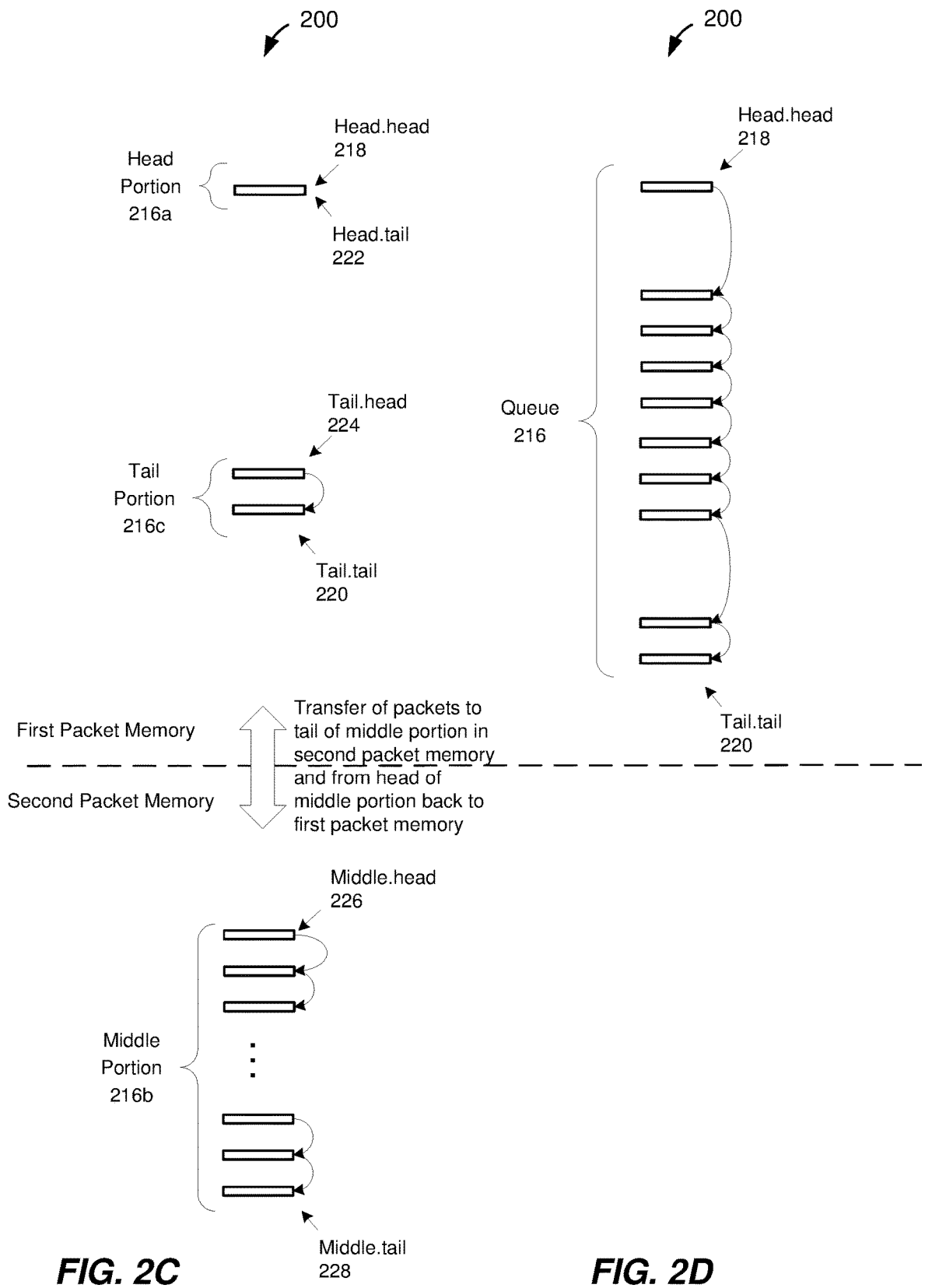

Referring now to FIG. 2C, the egress queue monitor 134 detects that a number of packets in the head portion of the queue in the internal memory 124 has fallen below a threshold, for example. In response to the detection that the number of packets in the head portion of the egress queue 216 is below the threshold, the memory controller 120 requests transfer of one or more packets, or a group of multiple packets, from the middle portion of the egress queue 216 to be transferred from the external packet memory 128 back to the internal packet memory 124. For example, the memory controller 120 generates a request signal indicating the particular egress queue 216 for which to transfer the packets. The request signal also indicates a number of packets from the particular egress queue 216 to be transmitted from the external packet memory 128 to the internal packet memory 124, in an embodiment. In another embodiment, the request signal indicates a buffer address that stores a group of multiple packets at a head of the middle portion of the particular egress queue 216b in the external packet memory 128. Packets are then transferred beginning with a packet, or a group of packets, currently at the head of the middle portion 216b of the egress queue 216, as indicated by the current value of the Middle.head indicator 226, and continuing down the middle portion 216b until a last packet from the middle portion 216b is transferred to the internal packet memory 124, in an embodiment. Subsequently, the memory controller 120 requests additional packets, or additional groups of packets, from middle portion 216b to be transferred, as needed, to the internal packet memory 124 for transmission of the packets from the network device 100. In response to a subsequent request, packets, or groups of packets, that are at the head of the middle portion 216b in the external packet memory 128 are transferred back to the internal packet memory 124, and so on, in an embodiment. Also, the memory control device 120 continues to transfer additional packets, or additional groups of packets, from the queue 216 in the internal packet memory 124 to the middle portion of the queue 216b in the external packet memory 128, in an embodiment.

Referring now to FIG. 2D, the packets transferred from the external packet memory 128 to the internal packet memory 124 are linked with the tail of the head portion 218 of the egress queue 216 in the internal packet memory 124, in an embodiment. For example, the egress manager 132 links the packets transferred from the external packet memory 128 to the internal packet memory 124 by linking a first packet transferred to the external packet memory with the packet in the internal packet 124 indicated by the current value of the Head.tail indicator 222, updating the Head.tail indicator 222, linking the next packet transferred to the external packet memory with the packet in the internal packet 124 indicated by the current value of the Head.tail indicator 222, and so on, in an embodiment. Also, the packet at the tail of the middle portion of the egress queue 216 is linked to the head of the trail portion of the egress queue 216 in the internal packet memory 124, in an embodiment.

Figure 3:
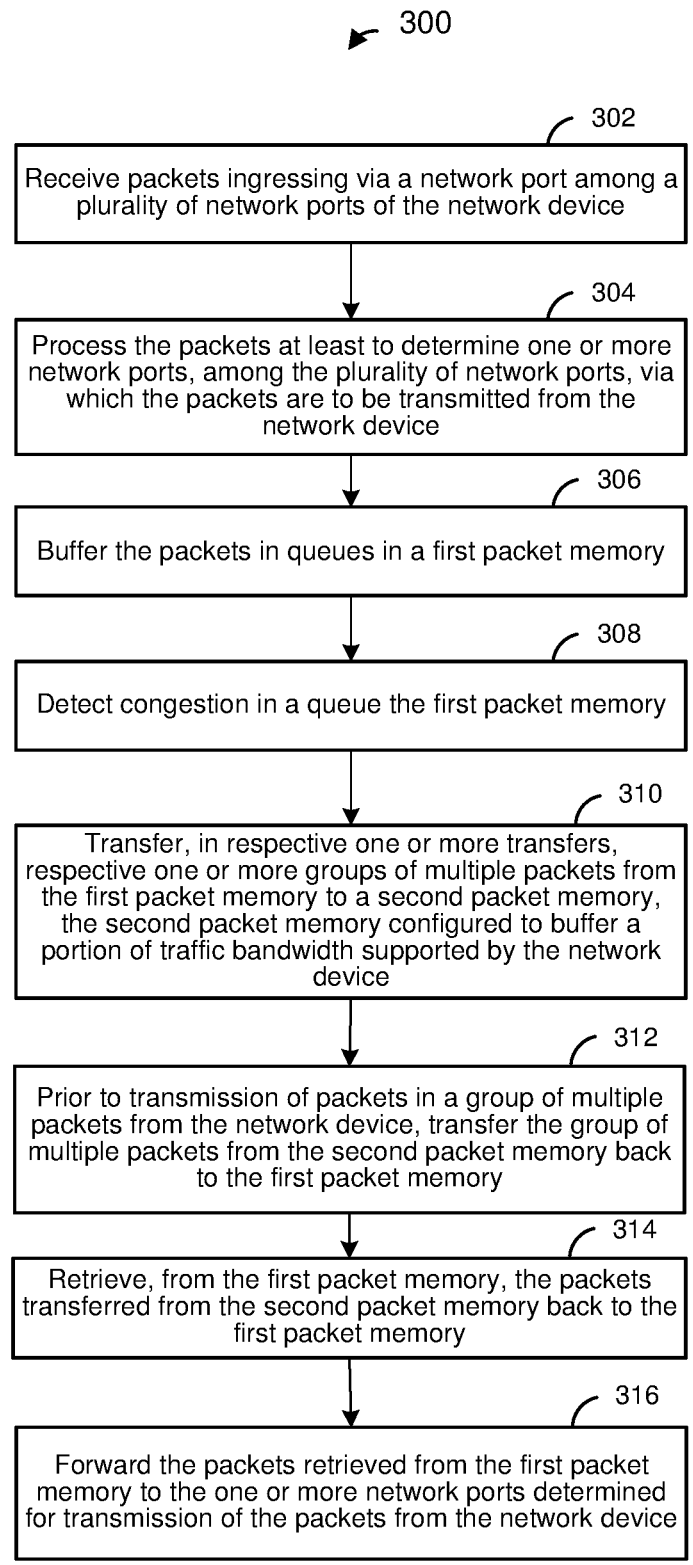
FIG. 3 is a flow diagram illustrating an example method for processing packets in a network device configured to implement spill-over of packets from a first packet memory to one or more second packet memories, according to an embodiment.

FIG. 3 is a flow diagram illustrating an example method 300 for processing packets in a network device, according to an embodiment. In an embodiment, the network device 100 of FIG. 1 implements the method 300 to process packets. For example, in an embodiment, the packet processor 112 of the network device 100 implements at least a portion of the method 300 to process packets. For ease of explanation, the method 300 is described with reference to the network device 100 of FIG. 1. In other embodiments, the method 300 is implemented by other suitable network devices.

At a block 302, packets are received by the network device. In an embodiment, the packets are received via a network port 108 of the network device 100. The packets received by the network device are provided to a packet processor (e.g., the packet processor 112) for processing of the packets, in an embodiment.

At block 304, the packets are processed by the packet processor at least to determine one or more network ports, among the plurality of network ports of the network device, via which the packets are to be transmitted from the network device. In an embodiment, the packets are processed the packet processor 112 (e.g., the forwarding engine 130) of the network device to determine one or more ports 108 via which to transmit the packets.

At block 306, the packets are buffered in a first packet memory, for example because the ports are not immediately available for transmission of the packets. In an embodiment the packets are buffered in a first packet memory (e.g., the packet memory 124) that is internal to the network device. In an embodiment, the first packet memory has a sufficiently high access bandwidth to support the full bandwidth supported by the network device. For example, the first packet memory supports writing and retrieval of packets at a rate that corresponds to the line rate supported by the network device, in an embodiment. In an embodiment, buffering of packets in the first packet memory includes queueing the packets in ones of a plurality of egress queues formed in the first packet memory, respective egress queue corresponding to respective ports of the network device and/or respective priorities of the packets.

At block 308, congestion is detected in a queue in the first packet memory. In an embodiment, the egress queue monitor 134 detects congestion in the queue in the first packet memory. In an embodiment, congestion is detected in a particular egress queue formed in the first packet memory. For example, congestion is detected in a particular egress queue when a fill level or a length of the particular egress queue is above a threshold. In other embodiments, congestion is detected in other suitable manners.

At block 310, in response to detecting congestion in the queue in the first packet memory, one or more groups of multiple packets from the first packet memory are transferred, in respective one or more transfers, to a second packet memory. In an embodiment the one or more groups of multiple packets are transferred to a packet memory (e.g., the packet memory 128) that is external to the packet processor of the network device, or housed in a separate memory device that is external to the network device. The second packet memory configured to buffer a portion of traffic bandwidth supported by the network device. In an embodiment, the second packet memory does not have a sufficiently high access bandwidth to support the full bandwidth supported by the network device. For example, the second packet memory does not support writing and retrieval of packets at a rate that corresponds to the line rate supported by the network device, in an embodiment. In an embodiment, the one or more packets are transferred from the egress queue that was detected to the congested in the first packet memory to a corresponding egress queue in a second packet memory. For example, a middle portion of the egress queue is transferred from the first packet memory to a corresponding egress queue in the second packet memory, while a header portion and a tail portion of the egress queue remain in the first packet memory, in an embodiment.

At block 312, subsequent to transferring a group of multiple packets from the first packet memory to the second packet memory and prior to transmission of packets among the group of multiple packets from the network device, the group of multiple packets is requested to be transferred back to the first packet memory. For example, the memory controller 120 generates a request for transfer of the group of multiple packets from the second packet memory, and provides the request to the second packet memory to request transfer of the group of multiple packets from the second packet memory to the first packet memory. In an embodiment, the group of multiple packets is requested to be transferred from the second packet memory to the first packet memory in response to detecting that a length of a head of an egress queue in which the group of multiple packets were queued in the first packet memory is below a threshold. In an embodiment, when the group of multiple packets is transferred from the second packet memory to the first packet memory, the group of multiple packets is re-linked with a tail of the head of the egress queue in the first packet memory.

At block 314, the packets transferred from the second packet memory back to the first packet memory are retrieved from the first packet memory. For example, a packet is retrieved from the first packet memory when the packet is at the head of an egress queue in the first packet memory and when the egress queue is scheduled for transmission from the network device 100. At block 318, the packets retrieved from the first packet memory are forwarded to the one or more network ports determined for transmission of the one or more packets from the network device.

In an embodiment, a method for processing packets in a network device includes: receiving, at a packet processor of the network device, packets ingressing via a network port among a plurality of network ports of the network device; processing, with the packet processor, the packets at least to determine one or more network ports, among the plurality of network ports, via which the packets are to be transmitted from the network device; buffering, with the packet processor, the packets in a first packet memory; detecting congestion in a queue in the first packet memory; in response to detecting congestion in the first packet memory, dynamically transferring, in respective one or more transfers, respective one or more groups of multiple packets from the first packet memory to a second packet memory, the second packet memory configured to buffer a portion of traffic bandwidth supported by the network device; subsequent to transferring a group of multiple packets from the first packet memory to the second packet memory and prior to trans- mission of packets among the group of multiple packets from the network device, requesting, with the packet processor, transfer of the group of multiple packets from the second packet memory back to the first packet memory; retrieving, with the packet processor from the first packet memory, the packets transferred from the second packet memory back to the first packet memory; and forwarding, with the packet processor, the packets retrieved from the first packet memory to the one or more network ports determined for transmission of the packets from the network device.

In other embodiments, the method includes any suitable combination of one or more of the following features.

Buffering the packets in queues in the first packet memory comprises buffering the packets in egress queues formed in the first packet memory, the egress queues corresponding to network ports via which the packets are to be transmitted by the network device.

Detecting congestion in the queue in the first packet memory comprises detecting congestion in a particular egress queue corresponding to a particular network port of the network device.

Transferring the one or more groups of multiple packets to the second packet memory comprises transferring the one or more group of multiple packets from the particular egress queue to the second packet memory.

Transferring the one or more groups of multiple packets from the particular egress queue to the second packet memory comprises transferring the one or more groups of multiple packets from a middle portion of the particular egress queue while at least a head portion of the particular egress queue remains in the first packet memory.

The method further comprises, while the one or more groups of multiple packets from the middle of the particular egress queue are stored in the second packet memory, enqueuing one or more additional packets at a tail of a tail portion of the particular egress queue stored in the first packet memory.

The method further comprises, while the one or more groups of multiple packets from the middle of the particular egress queue are stored in the second packet memory, retrieving packets from the head portion of the particular egress queue in the first packet memory, and transmitting the packets retrieved from the head portion of the particular egress queue in the first packet memory from the particular network port of the network device.

Requesting transfer of the packets among the one or more groups of multiple packets comprises requesting transfer of the packets from the middle portion of the particular egress queue from the second packet memory to the first packet in response to detecting that a length of the header portion of the particular egress queue stored in the first packet memory is below a threshold.

The method further comprises linking the packets transferred from the second packet memory back to the first packet memory with a tail of the header portion of the particular egress queue in the first packet memory.

Buffering the packets in queues in the first packet memory comprises buffering the packets in queues in a first memory device that is internal to the packet processor, and transferring the one or more packets from the first packet memory to the second packet memory comprises transferring the one or more packets to a second memory device that is external to the packet processor.

The second packet memory device is coupled to the network device via a particular network port among the plurality of network ports of the network device.

Transferring the one or more groups of multiple packets to the second memory device includes retrieving a group of multiple packets from the first memory device, and forwarding the group of multiple packets to the particular network port for transmission of the group of multiple packets, as a single transfer, to the second memory device via the network port.

The second packet memory is one of a plurality of second packet memories external to the packet processor, respective second packet memories configured to buffer respective portions of traffic bandwidth supported by the network device.

The method further comprises selecting, with the packet processor, a particular second memory from among the plurality second memories, and transferring the one or more groups of multiple packets, in respective transfers, to the particular second packet memory selected from among the plurality of second memories.

In another embodiment, a network device comprises a plurality of network ports configured to couple to a plurality of network links and a packet processor coupled to the plurality of network ports. The packet processor configured to: process packets, received via a network port among the plurality of network ports of the network device, at least to determine one or more network ports, among the plurality of network ports, via which the packets are to be transmitted from the network device; buffer the packets in queues a first packet memory; detect congestion in a queue in the first packet memory; in response to detecting congestion in the first packet memory, dynamically transfer, in respective one or more transfers, respective one or more groups of multiple packets from the first packet memory to a second packet memory, the second packet memory configured to buffer a portion of traffic bandwidth supported by the network device; subsequent to transferring a group of multiple packets from the first packet memory to the second packet memory and prior to transmission of packets among the group of multiple packets from the network device, request transfer of the group of multiple packets from the second packet memory back to the first packet memory; retrieve, from the first packet memory, the packets transferred from the second packet memory back to the first packet memory; and forward the packets retrieved from the first packet memory to the one or more network ports determined for transmission of the packets from the network device.

In other embodiments, the network device comprises any suitable combination of one or more of the following features.

The packet processor is configured to buffer the packets in egress queues formed in the first packet memory, the egress queues corresponding to network ports via which the packets are to be transmitted by the network device, detect congestion in the queue in the first packet memory at least by detecting congestion in a particular egress queue corresponding to a particular network port of the network device, and transfer the one or more groups of multiple packets to the second packet memory at least by transferring one or more groups of multiple packets from the particular egress queue to the second packet memory.

The packet processor is configured to transfer the one or more groups of multiple packets from a middle portion of the particular egress queue while at least a head portion of the particular egress queue remains in the first packet memory.

The packet processor is further configured to, while the one or more groups of multiple packets from the middle of the particular egress queue are stored in the second packet memory, enqueue one or more additional packets at a tail of a tail portion of the particular egress queue stored in the first packet memory.

The packet processor is further configured to retrieve one or more packets from the head portion of the particular egress queue in the first packet memory, and cause the one or more packets retrieved from the head portion of the particular egress queue in the first packet memory to be transmitted from the particular network port of the network device.

The packet processor is configured to request transfer of packets among the one or more groups of multiple packets from the middle portion of the particular egress queue from the second packet memory to the first packet in response to detecting that a length of the header portion of the particular egress queue stored in the first packet memory is below a threshold.

The packet processor is further configured to link the packets transferred from the second packet memory back to the first packet memory with a tail of the header portion of the particular egress queue in the first packet memory.

The first packet memory resides in a first memory device that is internal to the packet processor.

The second packet memory resides in a second memory device that is external to the packet processor.

The second packet memory device is coupled to the network device via a particular network port among the plurality of network ports of the network device.

The packet processor is configured to transfer a group of multiple packets to the second memory device at least by retrieving the group of multiple packets from the first memory device and forwarding the group of multiple packets to the particular network port for transmission of the group of multiple packets, as a single transfer, to the second memory device via the network port.

The second packet memory is one of a plurality of second packet memories external to the packet processor, respective second packet memories configured to buffer respective portions of traffic bandwidth supported by the network device.

The packet processor is further configured to select a particular second memory from among the plurality second memories, and transfer the one or more groups of multiple packets to the particular second packet memory selected from among the plurality of second memories.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing packets in a network device, the method comprising:
- receiving, at a packet processor of the network device, packets ingressing via a network port among a plurality of network ports of the network device;
- processing, with the packet processor, the packets at least to determine one or more network ports, among the plurality of network ports, via which the packets are to be transmitted from the network device;
- buffering, with the packet processor, the packets in a first packet memory in a plurality of queues, including buffering packets in a first queue, among the plurality of queues, as a linked list;
- detecting congestion in the first packet memory;
- in response to detecting congestion in the first packet memory, dynamically transferring, in respective one or more transfers, respective one or more groups of multiple packets from the first packet memory to a second packet memory, the second packet memory configured to buffer a portion of traffic bandwidth supported by the network device;
- maintaining, at the packet processor, the linked list of packets in the first queue across the first packet memory and the second packet memory;
- subsequent to transferring a group of multiple packets in the first queue from the first packet memory to the second packet memory and prior to transmission of packets among the group of multiple packets from the network device, requesting, with the packet processor, transfer of the group of multiple packets in the first queue from the second packet memory back to the first packet memory;
- retrieving, with the packet processor from the first packet memory, the packets transferred from the second packet memory back to the first packet memory; and
- forwarding, with the packet processor, the packets retrieved from the first packet memory to the one or more network ports determined for transmission of the packets from the network device.

2. The method of claim 1, wherein
- buffering the packets in queues in the first packet memory comprises buffering the packets in egress queues formed in the first packet memory, the egress queues corresponding to network ports via which the packets are to be transmitted by the network device, wherein buffering packets in the first queue comprises buffering packets in a particular egress queue corresponding to a particular network port of the network device,
- detecting congestion in the first packet memory comprises detecting congestion in the particular egress queue, and
- transferring the one or more groups of multiple packets to the second packet memory comprises transferring the one or more group of multiple packets from the particular egress queue to the second packet memory.

3. The method of claim 2, wherein transferring the one or more groups of multiple packets from the particular egress queue to the second packet memory comprises transferring the one or more groups of multiple packets from a middle portion of the particular egress queue while at least a head portion of the particular egress queue remains in the first packet memory.

4. The method of claim 3, further comprising, while the one or more groups of multiple packets from the middle of the particular egress queue are stored in the second packet memory, enqueuing one or more additional packets at a tail of a tail portion of the particular egress queue stored in the first packet memory.

5. The method of claim 3, further comprising, while the one or more groups of multiple packets from the middle of the particular egress queue are stored in the second packet memory,
- retrieving packets from the head portion of the particular egress queue in the first packet memory, and
- transmitting the packets retrieved from the head portion of the particular egress queue in the first packet memory from the particular network port of the network device.

6. The method of claim 3, wherein requesting transfer of the packets among the one or more groups of multiple packets comprises requesting transfer of the packets from the middle portion of the particular egress queue from the second packet memory to the first packet in response to detecting that a length of the header portion of the particular egress queue stored in the first packet memory is below a threshold.

7. The method of claim 3, further comprising linking the packets transferred from the second packet memory back to the first packet memory with a tail of the header portion of the particular egress queue in the first packet memory.

8. The method of claim 1, wherein
- buffering the packets in queues in the first packet memory comprises buffering the packets in a first memory device that is internal to the packet processor, and
- transferring the one or more packets from the first packet memory to the second packet memory comprises transferring the one or more packets to a second memory device that is external to the packet processor.

9. The method of claim 3, wherein
- the second packet memory device is coupled to the network device via a particular network port among the plurality of network ports of the network device, and
- transferring the one or more groups of multiple packets to the second memory device includes
  - retrieving a group of multiple packets from the first memory device, and
  - forwarding the group of multiple packets to the particular network port for transmission of the group of multiple packets, as a single transfer, to the second memory device via the network port.

10. The method of claim 1, wherein
- the second packet memory is one of a plurality of second packet memories external to the packet processor, respective second packet memories configured to buffer respective portions of traffic bandwidth supported by the network device, and
- the method further comprises
  - selecting, with the packet processor, a particular second memory from among the plurality second memories, and
  - transferring the one or more groups of multiple packets, in respective transfers, to the particular second packet memory selected from among the plurality of second memories.

11. The method of claim 1, further comprising:
- in connection with transferring the group of multiple packets from the second packet memory back to the first packet memory, maintaining the linked list of packets in the first queue.

12. A network device, comprising:
- a plurality of network ports configured to couple to a plurality of network links;

and a packet processor coupled to the plurality of network ports, the packet processor configured to
process packets, received via a network port among the plurality of network ports of the network device, at least to determine one or more network ports, among the plurality of network ports, via which the packets are to be transmitted from the network device,
buffer the packets in a first packet memory in a plurality of queues, including buffering packets in a first queue, among the plurality of queues, as a linked list of packets,
detect congestion in the first packet memory,
in response to detecting congestion in the first packet memory, dynamically transfer, in respective one or more transfers, respective one or more groups of multiple packets from the first packet memory to a second packet memory, the second packet memory configured to buffer a portion of traffic bandwidth supported by the network device,
maintain the linked list of packets in the first queue across the first packet memory and the second packet memory,
subsequent to transferring a group of multiple packets in the first queue from the first packet memory to the second packet memory and prior to transmission of packets among the group of multiple packets from the network device, request transfer of the group of multiple packets in the first queue from the second packet memory back to the first packet memory,
retrieve, from the first packet memory, the packets transferred from the second packet memory back to the first packet memory, and
forward the packets retrieved from the first packet memory to the one or more network ports determined for transmission of the packets from the network device.

13. The network device of claim 12, wherein the packet processor is configured to
buffer the packets in egress queues formed in the first packet memory, the egress queues corresponding to network ports via which the packets are to be transmitted by the network device, wherein buffering packets in the first queue according to the order comprises buffering packets in a particular egress queue corresponding to a particular network port,
detect congestion the first packet memory at least by detecting congestion in the particular egress queue, and
transfer the one or more groups of multiple packets to the second packet memory at least by transferring one or more groups of multiple packets from the particular egress queue to the second packet memory.

14. The network device of claim 13, wherein the packet processor is configured to transfer the one or more groups of multiple packets from a middle portion of the particular egress queue while at least a head portion of the particular egress queue remains in the first packet memory.

15. The network device of claim 14, wherein the packet processor is further configured to, while the one or more groups of multiple packets from the middle of the particular egress queue are stored in the second packet memory, enqueue one or more additional packets at a tail of a tail portion of the particular egress queue stored in the first packet memory.

16. The network device of claim 14, wherein the packet processor is further configured to
retrieve one or more packets from the head portion of the particular egress queue in the first packet memory, and
cause the one or more packets retrieved from the head portion of the particular egress queue in the first packet memory to be transmitted from the particular network port of the network device.

17. The network device of claim 14, wherein the packet processor is configured to request transfer of packets among the one or more groups of multiple packets from the middle portion of the particular egress queue from the second packet memory to the first packet in response to detecting that a length of the header portion of the particular egress queue stored in the first packet memory is below a threshold.

18. The network device of claim 14, wherein the packet processor is further configured to link the packets transferred from the second packet memory back to the first packet memory with a tail of the header portion of the particular egress queue in the first packet memory.

19. The network device of claim 12, wherein
the first packet memory resides in a first memory device that is internal to the packet processor, and
the second packet memory resides in a second memory device that is external to the packet processor.

20. The network device of claim 12, wherein
the second packet memory device is coupled to the network device via a particular network port among the plurality of network ports of the network device, and
the packet processor is configured to transfer a group of multiple packets to the second memory device at least by
retrieving the group of multiple packets from the first memory device, and
forwarding the group of multiple packets to the particular network port for transmission of the group of multiple packets, as a single transfer, to the second memory device via the network port.

21. The network device of claim 12, wherein
the second packet memory is one of a plurality of second packet memories external to the packet processor, respective second packet memories configured to buffer respective portions of traffic bandwidth supported by the network device, and
the packet processor is further configured to
select a particular second memory from among the plurality second memories, and
transfer the one or more groups of multiple packets to the particular second packet memory selected from among the plurality of second memories.

22. The network device of claim 12, wherein the packet processor is further configured to:
in connection with transferring the group of multiple packets from the second packet memory back to the first packet memory, maintain the linked list of packets in the first queue.

* * * * *